United States Patent
Jur et al.

(10) Patent No.: US 12,374,508 B2
(45) Date of Patent: Jul. 29, 2025

(54) DETACHABLE BARRIER FOR ELECTRICAL SWITCHING APPARATUS

(71) Applicant: EATON INTELLIGENT POWER LIMITED, Dublin (IE)

(72) Inventors: Arthur J. Jur, Cleveland, TN (US); Jeffrey B. Ensley, Cleveland, TN (US); Dallas J. Bostian, Cleveland, TN (US); Steven G. Grosick, Benton, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 186 days.

(21) Appl. No.: 18/137,634

(22) Filed: Apr. 21, 2023

(65) Prior Publication Data
US 2023/0343524 A1    Oct. 26, 2023

Related U.S. Application Data

(60) Provisional application No. 63/333,338, filed on Apr. 21, 2022.

(51) Int. Cl.
*H01H 9/34* (2006.01)
*H02B 3/00* (2006.01)
*H02B 13/025* (2006.01)

(52) U.S. Cl.
CPC ............. *H01H 9/34* (2013.01); *H02B 3/00* (2013.01); *H02B 13/025* (2013.01)

(58) Field of Classification Search
CPC . H01H 9/34; H01H 9/32; H01H 9/341; H02B 3/00; H02B 1/14; H02B 13/025; G01R 1/206; G01R 21/12; G01R 21/56
USPC .............. 218/1, 77; 200/50.17, 50.21
See application file for complete search history.

(56) References Cited

U.S. PATENT DOCUMENTS

| | | | |
|---|---|---|---|
| 9,627,863 B1* | 4/2017 | Harrison | H02B 3/00 |
| 9,922,785 B2* | 3/2018 | Jur | H01H 21/06 |
| 9,966,740 B2 | 6/2018 | Faber et al. | |
| 10,079,478 B2* | 9/2018 | Seo | H01H 9/22 |
| 10,448,525 B2* | 10/2019 | Manahan | H05K 7/20 |
| 11,146,044 B2* | 10/2021 | Lefort | H02B 3/00 |
| 11,289,884 B2* | 3/2022 | Beaver | H02G 5/06 |
| 2018/0148953 A1* | 5/2018 | Robinson | E05C 9/063 |
| 2020/0262636 A1* | 8/2020 | Wiemann | B65D 81/3858 |
| 2021/0287860 A1* | 9/2021 | Rajvanshi | H02B 1/303 |

* cited by examiner

*Primary Examiner* — William A Bolton
(74) *Attorney, Agent, or Firm* — Eckert Seamans Cherin & Mellott, LLC (57) ABSTRACT

An arc shield for electrical switching apparatuses is provided. The arc shield comprises a mounting base and a detachable barrier and includes a multi-point mounting system that eliminates the need for hardware and gloves when installing the detachable barrier on the mounting base. The mounting base is formed with a hinge tab and two locking tabs, and the detachable barrier is formed with a corresponding notch and two tab receiving openings formed with retention profile. The notch can be seated on the hinge tab in order to establish a hinge, and once the hinge is established, the locking tabs can be inserted through the tab receiving openings by bending the detachable barrier. Once the bending force is removed, the retention profiles of the locking tabs ensure that the detachable barrier cannot be removed from the mounting base unless a bending force is intentionally reapplied to the barrier.

20 Claims, 8 Drawing Sheets

DETACHABLE BARRIER FOR ELECTRICAL SWITCHING APPARATUS

CROSS REFERENCE TO RELATED APPLICATIONS

This application claims priority to U.S. Patent Application Ser. No. 63/333,338 filed Apr. 21, 2022 and entitled, "Detachable Barrier for Electrical Switching Apparatus".

FIELD OF THE INVENTION

The disclosed concept relates generally to electrical switching apparatuses, and in particular, to barriers for protecting users from energized conductors in electrical switching apparatuses.

BACKGROUND OF THE INVENTION

Barriers are often provided in electrical switching equipment to shield a user from the line side connections of the electrical switches in the event that the user needs to access the electrical switches when the equipment is energized. Known barriers typically need to be attached to the switching equipment using hardware, and gloves typically need to be worn while using the hardware, in order to reduce the risk of electrical shock hazards and the risk of getting cut. The hardware can be difficult to hold while wearing gloves and attaching the barrier, making installation of the barrier cumbersome and time-consuming.

There is thus room for improvement in barriers that protect users from energized conductors in electrical switching apparatuses.

SUMMARY OF THE INVENTION

These needs, and others, are met by an arc shield comprising a mounting base and a detachable barrier, with features of the mounting base and detachable barrier forming a multipoint mounting system. The multipoint mounting system enables the detachable barrier to be quickly mounted onto the mounting base or detached from the mounting base without the use of hardware such as fasteners or tools.

In accordance with one aspect of the disclosed concept, an arc shield for an electrical apparatus is structured to shield a user from energized electrical components in the electrical apparatus, and comprises a mounting base and a detachable barrier. The mounting base comprises: a hinge tab that includes a ledge portion and a lip portion, and two locking tabs, with each locking tab including a retention portion with a retention profile. The detachable barrier comprises: a notch, and two tab receiving openings, with each tab receiving opening corresponding to one of the locking tabs. The notch is structured to be seated upon the ledge portion of the hinge tab such that the detachable barrier is positioned between a front surface of the mounting base and the lip portion of the hinge tab. Each locking tab has a tab width relative to a lengthwise dimension, the lengthwise dimension being orthogonal to the front surface of the mounting base. Each tab receiving opening is structured to enable the retention portion of the corresponding locking tab to extend frontward relative to a front surface of the detachable barrier when the notch is seated upon the ledge portion of the hinge tab, such that the retention portion obstructs the detachable barrier from moving frontward past the retention profile when no bending force is exerted upon the detachable barrier.

In accordance with another aspect of the disclosed concept, a method of installing a detachable barrier in an electrical switching apparatus to form an arc shield comprises: providing a mounting base that comprises a hinge tab and two locking tabs, with each locking tab including a retention portion with a retention profile; providing a detachable barrier that comprises a notch and two tab receiving openings, with each tab receiving opening corresponding to one of the locking tabs; seating the notch upon the ledge portion of the hinge tab; and inserting the retention portion of each locking tab through the corresponding tab receiving opening. The hinge tab includes a ledge portion and a lip portion. Each locking tab has a tab width relative to a lengthwise dimension, with the lengthwise dimension being orthogonal to a front surface of the mounting base. Seating the notch upon the ledge portion further comprises ensuring such that the detachable barrier is positioned between the front surface of the mounting base and the lip portion of the hinge tab. Inserting the retention portion of each locking tab through the corresponding tab receiving opening further comprises ensuring such that the retention portion extends frontward relative to a front surface of the detachable barrier.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As used herein, the term "switchbox" refers to an electrical junction point or load center used to safely open or close at least one electrical circuit.

As an initial matter, it is noted that three primary types of components are shown in the figures and described in detail herein, the three types of components being switchboxes, mounting bases, and detachable barriers. Multiple iterations of each of these three types of components are shown in the figures, with each iteration being rated for use within a specific range of current. Specifically, each of the components shown in the figures are rated for use at one of the following four current ratings: 30 amp (30 A), 30-60 amp (30-60 A), 60-100 amp (30-60 A), and 100 amp (100 A). As a function of the current rating, within a given component type (i.e. switchbox, mounting base, or detachable barrier), the dimensions of one specific iteration of the component type rated for use at one current rating can vary somewhat from the dimensions of a different specific iteration of the same component type that is rated for use at another current rating.

However, aside from the variation in dimension, each iteration of a given type of component has the same functional features as every other iteration of the same given type of component. Accordingly, the same reference numbers are used throughout the figures to refer to different iterations of the same type of component regardless of current rating, but each iteration (corresponding to current rating) of a given type of component is differentiated from every other iteration by the number of prime symbols (i.e. ') that follow the reference number. In particular, components rated for use at the 30-60 A rating are numbered with reference numbers that include one prime symbol (i.e. '), components rated for use at the 30 A rating are numbered with reference numbers that include two prime symbols (i.e. "), components rated for use at the 60-100 A rating are numbered with reference numbers that include three prime symbols (i.e. "'), and components rated for use at the 100 A rating are numbered with reference numbers that include four prime symbols (i.e. "").

Figure 1:
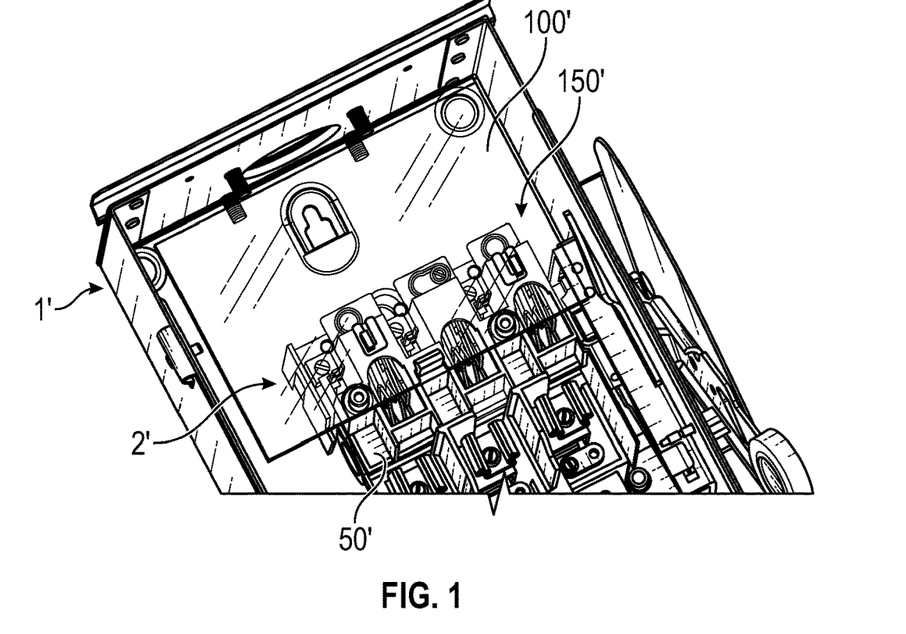
FIG. 1 is a perspective view of electrical switching equipment and a detachable barrier mounted on a mounting base installed within a 30-60 amp heavy duty switchbox, in accordance with an example embodiment of the disclosed concept.
Figure 2:
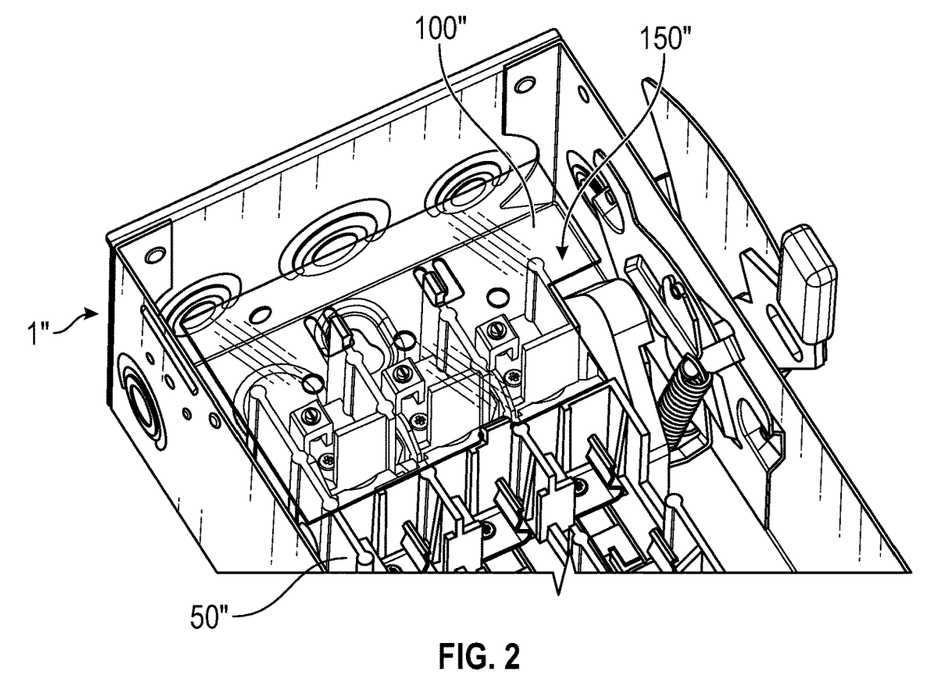
FIG. 2 is a perspective view of a detachable barrier mounted on a mounting base installed within a 30 amp general duty switchbox, with no electrical switching components installed, in accordance with another example embodiment of the disclosed concept.
Figure 3:
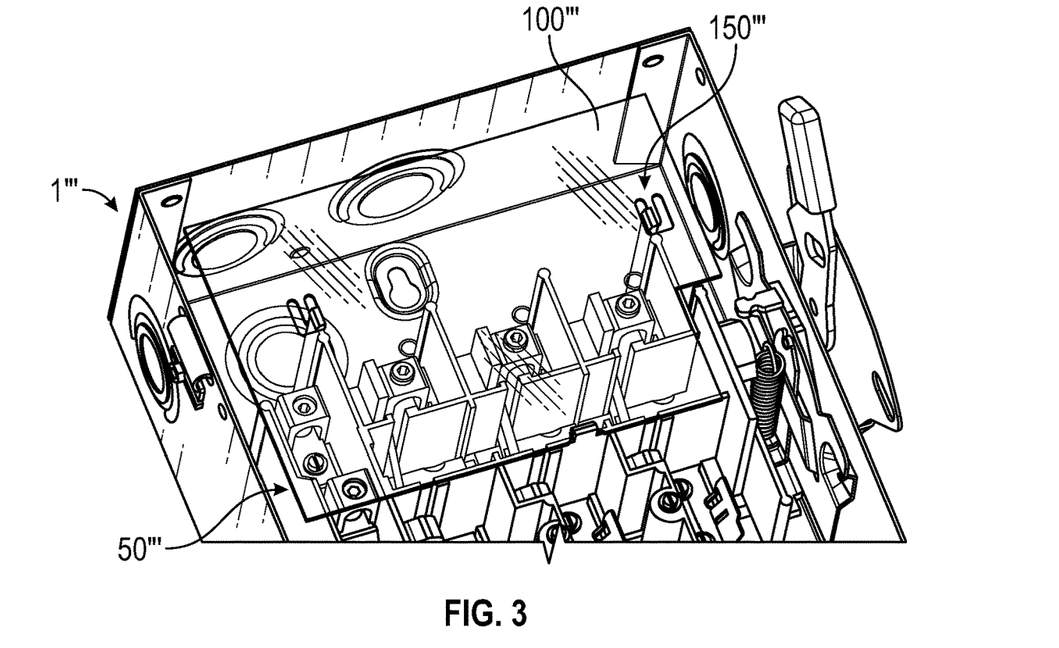
FIG. 3 is a perspective view of a detachable barrier mounted on a mounting base installed within a 60-100 amp general duty switchbox, with no electrical switching components installed, in accordance with another example embodiment of the disclosed concept.
Figure 4:
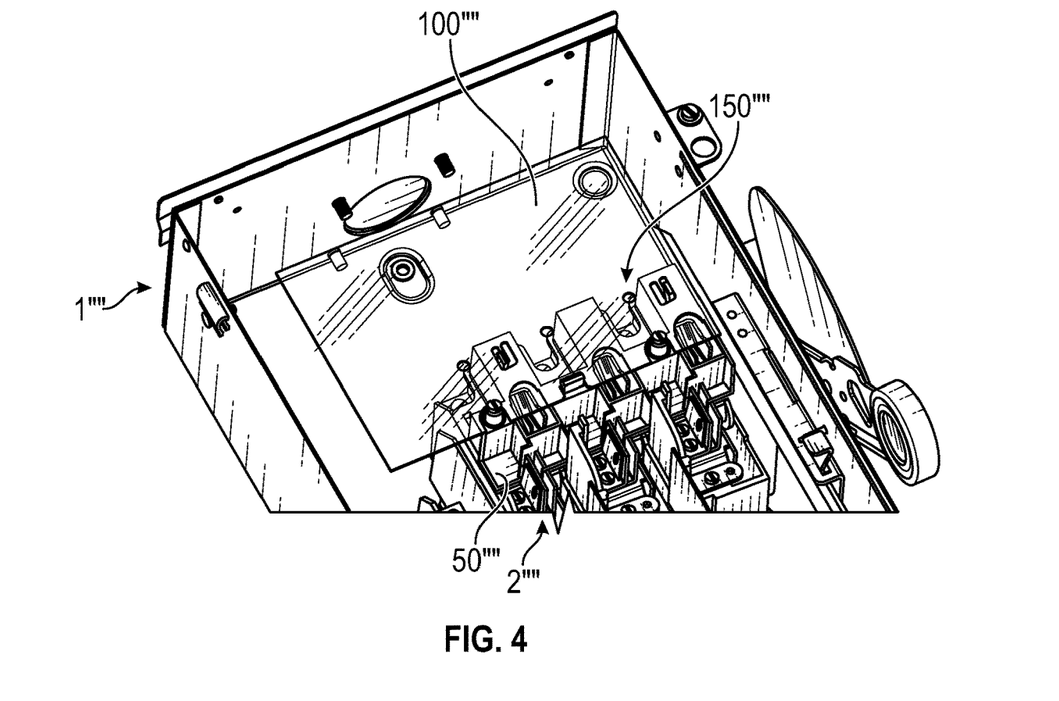
FIG. 4 is a perspective view of electrical switching equipment and a detachable barrier mounted on a mounting base installed within a 100 amp heavy duty switchbox, in accordance with another example embodiment of the disclosed concept.

Referring now to the figures, FIGS. 1-4 show four different iterations of switchboxes, mounting bases, and detachable barriers, in accordance with exemplary embodiments of the disclosed concept. It is noted that the switchboxes are used herein as a non-limiting, representative type of electrical switching apparatus. FIG. 1 shows a 30-60 A heavy duty switchbox 1', with a mounting base 50' installed within the switchbox 1' and a detachable barrier 100' mounted on the mounting base 50', in accordance with an exemplary embodiment of the disclosed concept. In addition to the safety barrier 100', various electrical switching components 2' are installed within the mounting base 50'. FIG. 2 shows a 30 A general duty switchbox 1", with a mounting base 50" installed and a detachable barrier 100" mounted on the mounting base 50", in accordance with another exemplary embodiment of the disclosed concept. In FIG. 2, no electrical switching components are installed within the mounting base 50", in order to better show details of the mounting base 50". FIG. 3 shows a 60-100 A general duty switchbox 1'", with a mounting base 50'" installed and a detachable barrier 100'" mounted on the mounting base 50'", in accordance with a further exemplary embodiment of the disclosed concept. FIG. 4 shows a 100 A heavy duty switchbox 1"", with a mounting base 50"" installed within the switchbox 1"" and a detachable barrier 100"" mounted on the mounting base 50"", as well as various electrical switching components 2"" installed within the mounting base 50"", in accordance with yet another exemplary embodiment of the disclosed concept.

All of the components shown in the figures can be referred to generally, either collectively or individually, by their reference number with the prime symbols omitted. For example and without limitation, the term "the switchboxes 1" can be used to refer to all of the switchboxes 1', 1", 1'", and 1"" collectively and generally, and the term "the switchbox 1" can be used to refer to any one of the switchboxes 1', 1", 1'", or 1"" individually and generally.

The disclosed concept makes use of a multipoint mounting system that enables each detachable barrier 100 to be quickly mounted onto its corresponding mounting base 50 or detached from its corresponding mounting base 50 without the use of fasteners or tools. Specifically, each mounting base 50 and each detachable barrier 100 includes features that form a multipoint mounting system. In each of FIGS. 1-4, the overlap of the detachable barrier 100 and the mounting base 50 forms an arc shield 150 that shields a user from the line side connections of the switchbox 1 and prevents the user from being able to touch the line side connections (the arc shield 150' being shown in FIG. 1, the arc shield 150" being shown in FIG. 2, the arc shield 150'" being shown in FIG. 3, and the arc shield 150"" being shown in FIG. 4). The advantageous features of the disclosed mounting bases 50 and detachable barriers 100 are discussed later herein in connection with FIGS. 5-7, which show the mounting base 50'" (also numbered as 50 in FIGS. 5 and 6) and the detachable barrier 100'" (also numbered as 100 in FIGS. 5 and 7) for the 60 A-100 A switchbox 1'".

Figure 5:
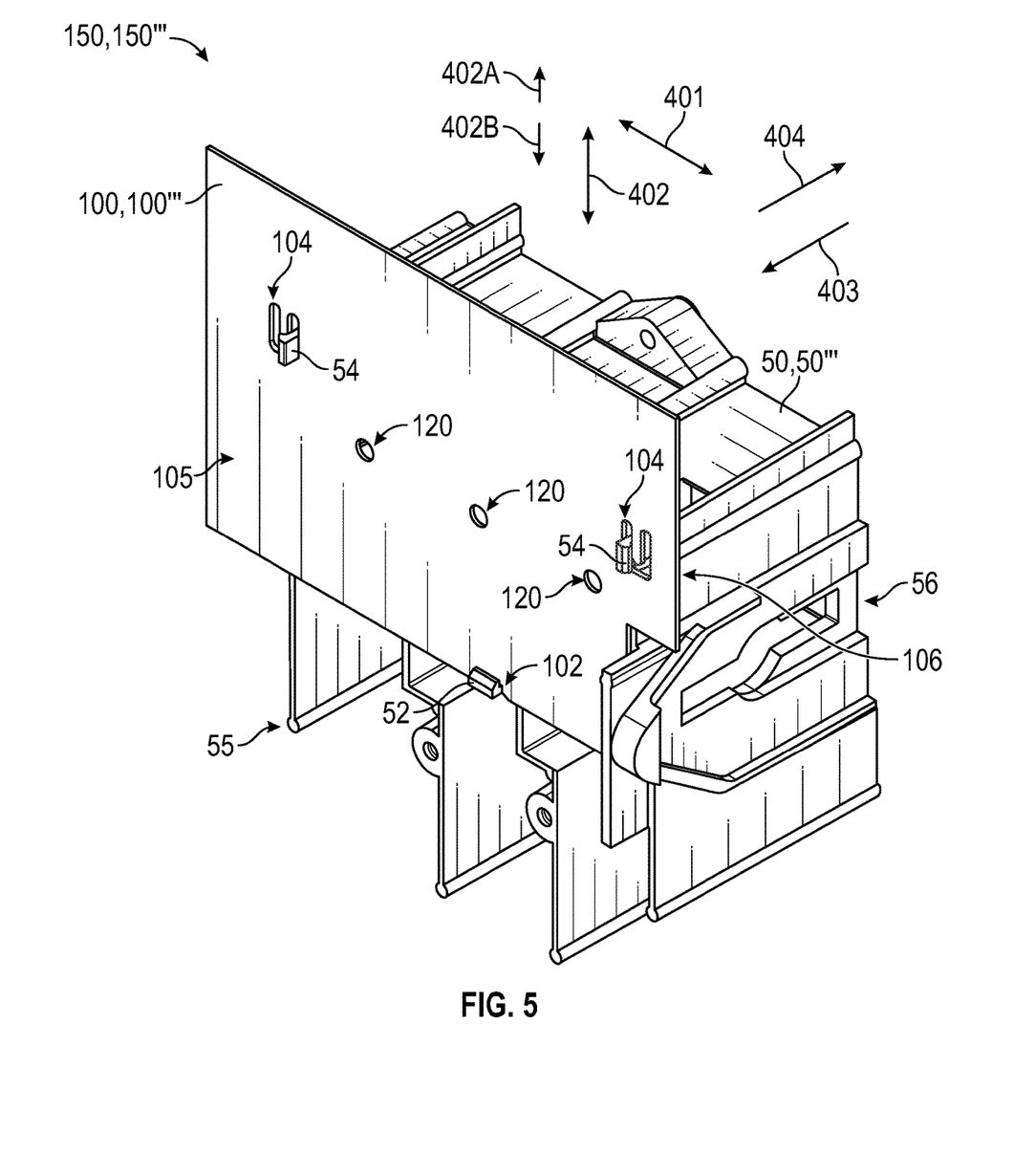
FIG. 5 is a rotated perspective view of the 60-100 amp detachable barrier and mounting base shown in FIG. 3, removed from the switchbox shown in FIG. 3.
Figure 6A:
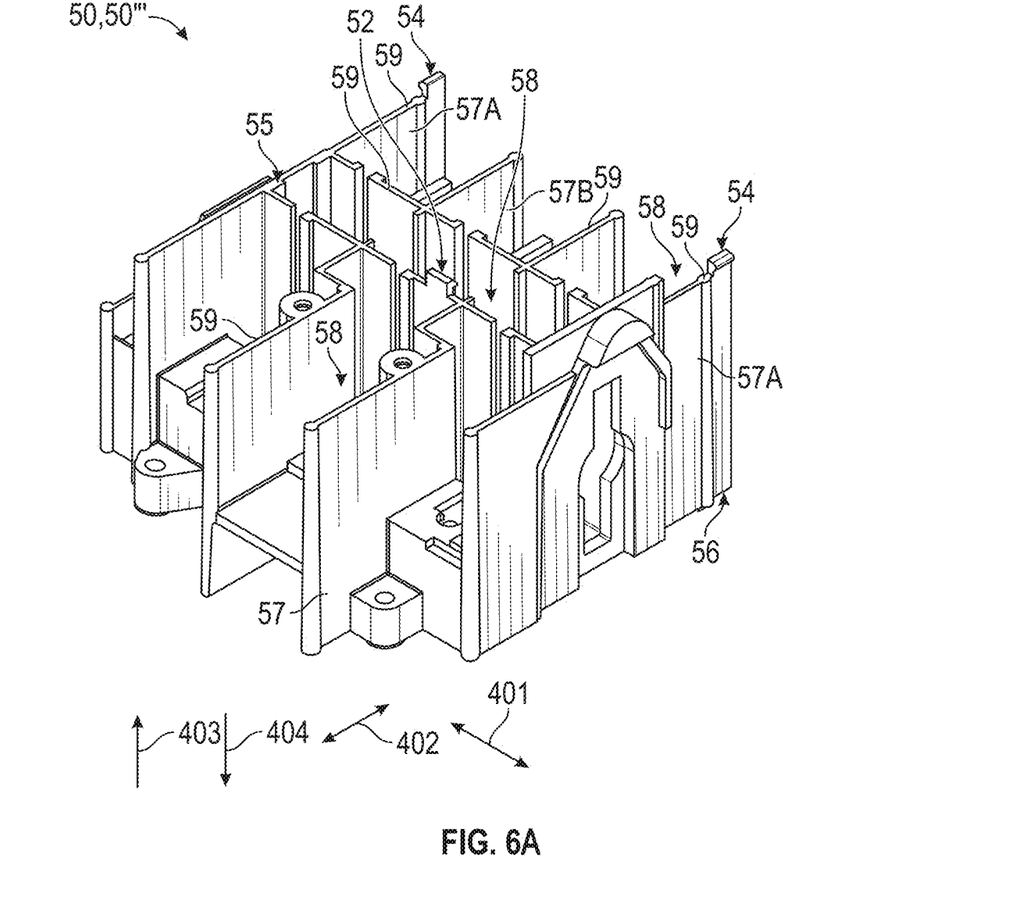
FIG. 6A is a rotated perspective view of the 60-100 amp mounting base shown in FIGS. 3 and 5, without the detachable barrier mounted.
Figure 6B:
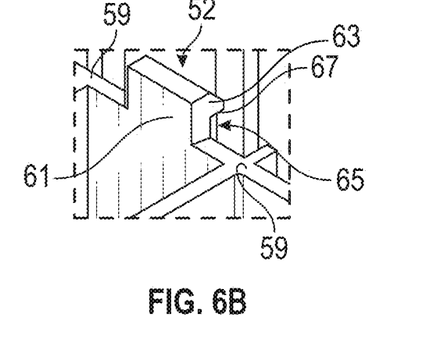
FIG. 6B is an enlarged view of a first portion of FIG. 6A.
Figure 6C:
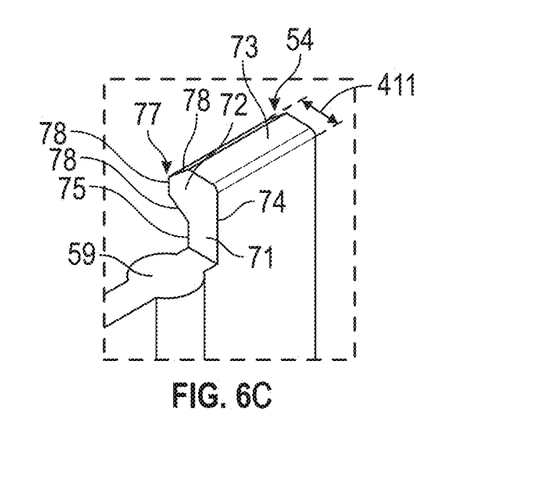
FIG. 6C is an enlarged view of a second portion of FIG. 6A.
Figure 7:
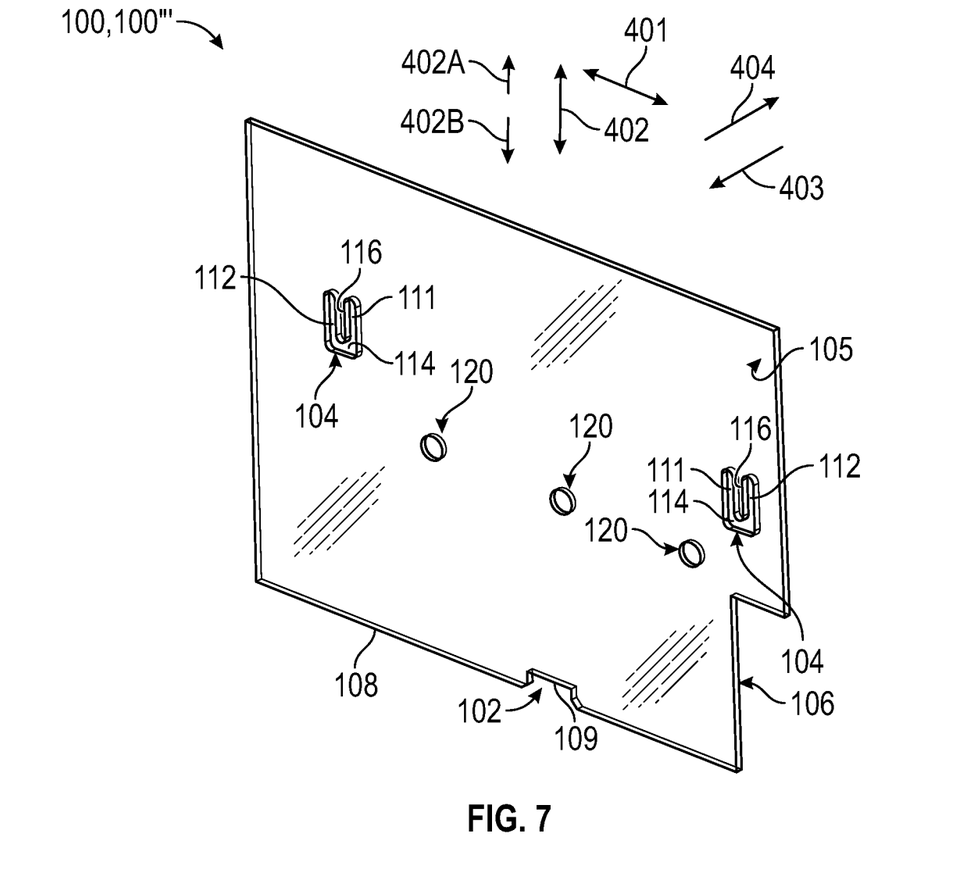
FIG. 7 is a rotated perspective view of the detachable barrier shown in FIGS. 3 and 5 removed from the 60-100 amp mounting base and switchbox.
Figure 8:
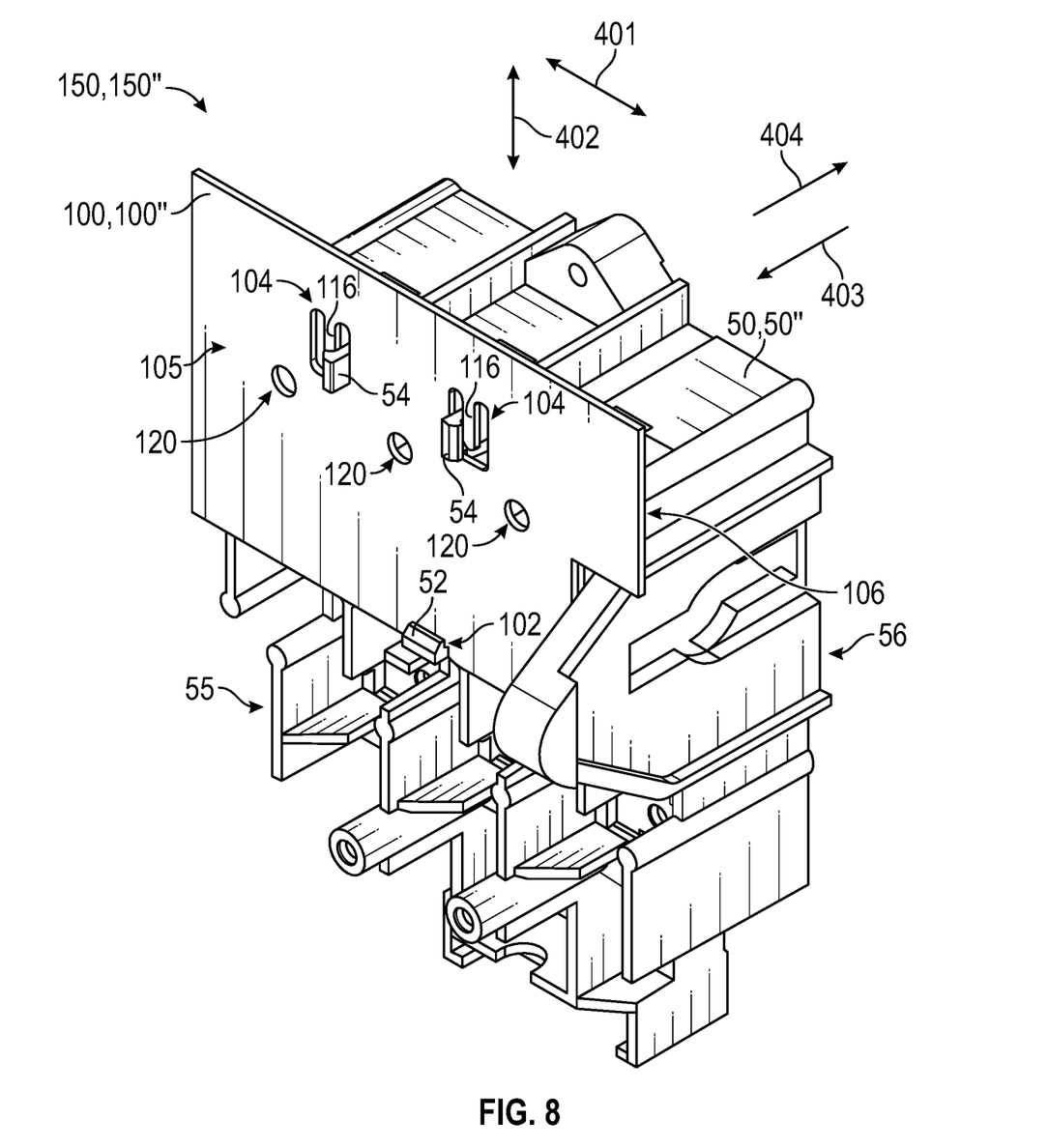
FIG. 8 is a rotated perspective view of the 30 amp detachable barrier and mounting base shown in FIG. 2, removed from the switchbox shown in FIG. 2.

It is noted that the mounting bases 50', 50", 50"" and the detachable barriers 100', 100", 10"" include the same or similar functional features as the mounting base 50'" and the detachable barrier 100'" shown in FIGS. 5-7. For example, FIG. 8 shows the mounting base 50" (also numbered as 50 in FIG. 8), and when a feature of the mounting base 50'" is discussed in conjunction with FIG. 5 or FIG. 6, reference can also be made to FIG. 8, since the mounting base 50" includes the same or similar features as the mounting base 50'". Similarly, FIG. 9 shows the detachable barrier 100"

Figure 9:
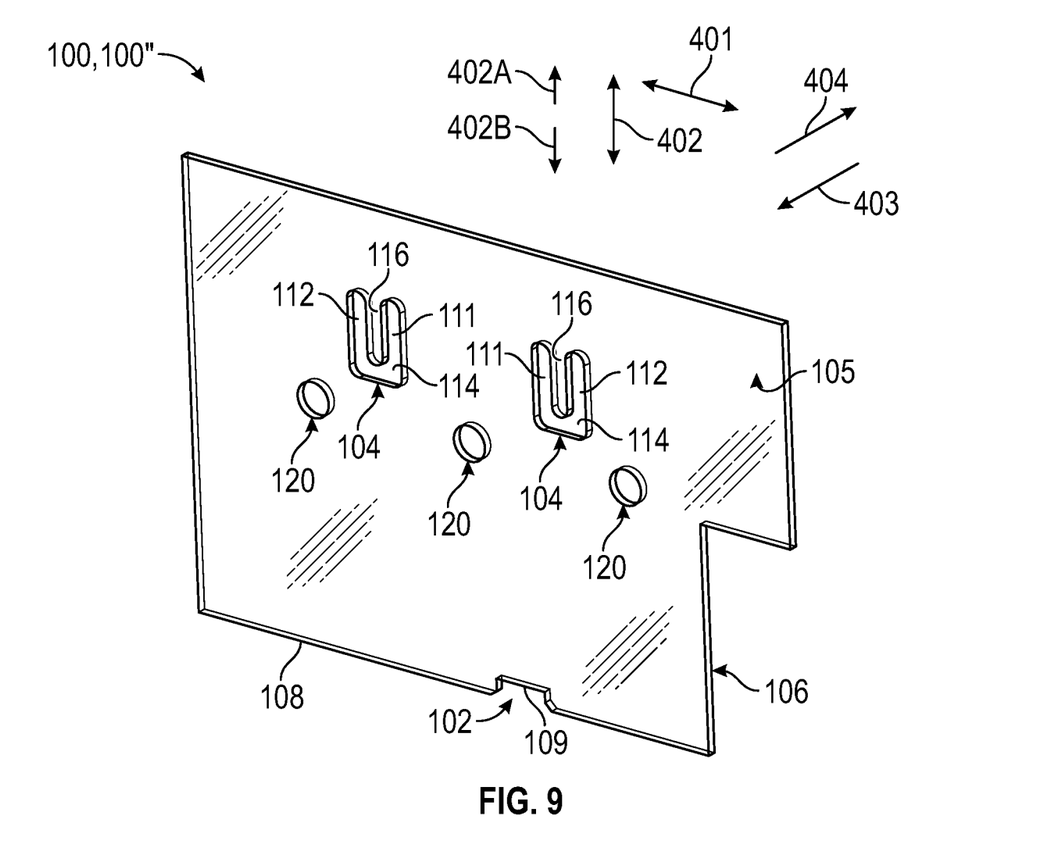
FIG. 9 is a perspective view of the detachable barrier shown in FIGS. 2 and 3 removed from the 30 amp heavy duty base and switchbox.

(also numbered as 100 in FIG. 9), and when a feature of the detachable barrier 100''' is discussed in conjunction with FIG. 5 or FIG. 7, reference can also be made to FIG. 9, since the detachable barrier 100'' includes the same or similar features as the detachable barrier 100'''. Thus, the features of the mounting base 50''' and the detachable barrier 100''' shown in FIGS. 5-7 are numbered using general reference numbers without prime symbols (as are the features of the mounting base 50'' and the detachable barrier 100'' shown in FIGS. 8 and 9), and it is to be understood that the features discussed in conjunction with FIGS. 5-7 are found in all iterations of the mounting bases 50 and in all iterations of the detachable barriers 100.

Referring now to FIG. 5, the detachable barrier 100 is shown mounted on the mounting base 50. The detachable barrier 100 is structured such that, when no force is exerted upon the barrier 100, the barrier 100 is planar. The mounting base 50 is produced from rigid material and is structured to house switches and other electrical components 2 used to facilitate electrical switching (said electrical components 2 not being shown in FIG. 5 but being similar to the electrical components 2 shown in FIGS. 1 and 3). The detachable barrier 100 is produced from semirigid material in some exemplary embodiments, and is produced from flexible material in other exemplary embodiments. Both the mounting base 50 and the detachable barrier 100 can be produced from insulating material.

As can be seen in FIG. 5 and FIG. 6, the mounting base 50 comprises three tabs: a hinge tab 52 and two locking tabs 54. As can be seen in FIG. 5 and FIG. 7, the detachable barrier 100 comprises a notch 102 and two tab receiving openings 104. The notch 102 and the hinge tab 52 are structured to engage one another, and each locking tab 54 corresponds to one of the tab receiving openings 104 such that each locking tab 54 is structured to engage with its corresponding tab receiving opening 104. The detachable barrier 100 is shown installed on the mounting base 50 in a locked state in FIG. 5, which is achieved when the notch 102 and the hinge tab 52 engage one another and when the locking tabs 54 extend through the tab receiving openings 104. The mechanics of the engagement between these components is detailed later herein.

For brevity of disclosure, the mounting base 50 and the detachable barrier 100 are discussed hereinafter as having the orientation shown in FIG. 5, such that the top, bottom, front, and back of the mounting base 50 and the detachable barrier 100 as shown in FIG. 5 are used as points of reference in subsequent discussions of the other figures. The detachable barrier 100 has a front side 105 and a rear side 106 disposed opposite the front side 105. The mounting base 50 has a front side 55 and a rear side 56 disposed opposite the front side 55. The rear side 106 of the detachable barrier 100 and the front side 55 of the mounting base 50 are structured to face one another when the detachable barrier 100 is installed on the mounting base 50. As denoted in FIG. 5, the mounting base 50 and the detachable barrier 100 each have a length relative to the linear dimension indicated by 401 and a height relative to the linear dimension indicated by arrow 402, with the dimensions 401 and 402 being orthogonal to one another. The arrow 402A indicates orientation toward the top of the mounting base 50 and the detachable barrier 100, and the arrow 402B indicates orientation toward the bottom of the mounting base 50 and the detachable barrier 100. Orientation toward the front of the mounting base 50 or detachable barrier 100 is indicated by the arrow 403, and orientation toward the rear of the mounting base 50 or detachable barrier 100 is indicated by the arrow 404. The frontward orientation 403 and rearward orientation 404 oppose one another and are orthogonal to the linear length and linear height dimensions 401 and 402. With respect to the directions/orientations indicated by the arrows 401, 402, 403, and 404, common variations of the associated directional terms are used herein. For example and without limitation, the linear dimension indicated by the arrow 401 is sometimes referred to herein as the "lengthwise dimension 401", and movement in the direction indicated by arrow 403 is sometimes referred to herein as "frontward 403".

Reference is now made to FIG. 6 in conjunction with FIG. 5. Relative to the lengthwise dimension 401, the hinge tab 52 of the mounting base 50 is positioned between the two locking tabs 54. Relative to the height dimension 402, both locking tabs 54 are positioned a distance away from and above the hinge tab 52. It is noted that, while each locking tab 54 is depicted as being disposed the same distance away from the hinge tab 52 in the height dimension 402 as the other locking tab 54, the base 50 can be produced with each locking tab 54 being disposed a different distance away from the hinge tab 52 relative to the other locking tab 54 in the height dimension 402, without departing from the scope of the disclosed concept.

Reference is now made to FIG. 7 in conjunction with FIG. 5. Relative to the lengthwise dimension 401, the notch 102 of the detachable barrier 100 is positioned between the two tab receiving openings 104. Relative to the height dimension 402, both locking tabs 54 are positioned a distance away from the hinge tab 52. Because each locking tab 54 is structured to cooperate with a corresponding one of the tab receiving openings 104 in order to lock the detachable barrier 100 to the mounting base 50 (as detailed later herein), each given tab receiving opening 104 is positioned a same or similar distance away from the notch 102 that the corresponding locking tab 54 is positioned away from the hinge tab 52.

The features of the hinge tab 52 and locking tabs 54 will now be detailed in conjunction with FIG. 6. The mounting base 50 is formed with a plurality of channel walls 57 (only some of which are numbered in FIG. 6). It is noted that the channel walls can be further identified as being exterior channel walls 57A, if they interface with the exterior of the mounting base 50, or as interior channel walls 57B if they only interface with the interior of the mounting base 50. All of the channel walls can be referred to generally, either individually or collectively as "channel wall(s) 57". The channel walls 57 define a plurality of channels 58 (only some of which are numbered in FIG. 6) that are structured to receive electrical components 2 (similar to those shown in FIGS. 1 and 3). The channel walls 57 comprise front surfaces 59, with all of the front surfaces 59 lying in the same plane as one another, and each channel 58 extends in the rearward direction 404 relative to the plane in which the front surfaces 59 lie.

Referring now to FIG. 6B, it is noted that the hinge tab 52 comprises a ledge portion 61 and a lip portion 63. The ledge portion 61 extends out in the frontward direction 403 from the front surfaces 59 adjacent to the ledge portion 61. The lip portion 63 extends out from the ledge portion 61 in the height dimension 402. The extension of the lip portion 63 from the ledge portion 61 creates a shelf 65 that extends from the plane in which the front surfaces 59 lie to a rear surface 67 of the lip portion 63.

Referring now to FIG. 6C, one of the locking tabs 54 is shown. It is noted that each locking tab 54 is formed at the front end of one of the channel walls 57, and that both locking tabs 54 have the same structural features as one another. As shown in FIG. 6C, the locking tab 54 comprises a base portion 71 and a retention portion 72. The base portion 71 extends in the frontward direction 403 from the channel wall front surface 59 and terminates in a front-most surface 73. The retention portion 72 extends outward from the base portion 71 in the length dimension 401. The base portion 71 has a long side 74 that extends from the channel wall front surface 59 to the front-most surface 73, and a short side 75 disposed opposite the long side 74, with the short side 75 being shorter than the long side 74. The short side 75 extends from the channel wall front surface 59 to the retention portion 72.

Continuing to refer to FIG. 6C, the retention portion 72 has a retention profile 77 that is orthogonal to the mounting base front surfaces 59, and that extends between the base portion short side 75 and the base portion front-most surface 73. The retention profile 77 is a curve in some embodiments and approximates a curve in other embodiments. When the retention profile 77 is formed as a curve, the curve extends between the base portion short side 75 and the base portion front most-surface 73. The retention profile 77 is formed to approximate a curve in FIGS. 5 and 6. When the retention profile 77 is formed to approximate a curve, the retention profile 77 is formed as a plurality of retention surfaces 78, such that each retention surface 78 is positioned at an obtuse angle relative to the adjacent surfaces, the adjacent surfaces being either other retention surfaces 78, the base portion short side 75, or the base portion front-most surface 73. It is noted that the length 411 of each locking tab 54 in the lengthwise dimension 401 is labeled in FIG. 6C, and that this length 411 is referenced later herein. The length 411 of each locking tab 54 is the distance from the base portion long side 74 to the point on the retention profile 77 positioned furthest away from the base portion long side 74 in the lengthwise dimension 401.

Reference is now made to FIG. 7 to discuss the features of the detachable barrier 100 that enable the detachable barrier 100 to be installed on the mounting base 50 in the locked position shown in FIG. 5. It is noted that the notch 102 is formed as a cutout in a bottom edge 108 of the detachable barrier 100 such that the cutout extends upward in the direction 402A from the bottom edge 108 and a top edge 109 of the cutout is positioned above the bottom edge 108. The length of the notch 102 in the length dimension 401 is slightly longer than the length of the hinge tab 52 (FIGS. 5 and 6) in the length dimension 401, enabling the detachable barrier 100 to be positioned such that its notch 102 can be easily placed on top of the shelf 65 (FIG. 6) formed by the hinge tab 52.

When the detachable barrier 100 needs to be installed on the mounting base 50, the first step of the installation process is to position the barrier rear surface 106 to face the mounting base front surface 55, and to place the notch 102 of the detachable barrier 100 on top of the shelf 65 of the hinge tab 52 so that the top edge 109 of the notch 102 sits upon the shelf 65. In this unlocked position (wherein the locking tabs 54 are not engaged with the tab receiving openings 104), the rear surface 67 of the hinge tab lip portion 63 (numbered in FIG. 6) engages the barrier front surface 105 at a position above the top edge 109 of the notch 102, thus preventing the barrier 100 from falling in the frontward direction 403. In the unlocked position, the engagement between the top edge 109 of the notch 102 and the shelf 65 functions as a hinge, enabling the detachable barrier 100 to be moved within a limited range of motion between a front point where the barrier front surface 105 engages the rear surface 67 of the hinge tab lip portion 63 and a rear point where the barrier rear surface 106 contacts the front side of the locking tabs 54. The hinge created by seating the notch 102 on the hinge tab 52 can be referred to as a "notched hinge", in order to denote that the hinge is produced by engagement between a notch (i.e. the notch 102) and a tab (i.e. the hinge tab 52) structured to engage the notch.

Referring once more to FIG. 7 in conjunction with FIG. 5, it is noted that the tab receiving openings 104 are formed as U-shaped cutouts in an exemplary embodiment of the disclosed concept. The U-shape is found to be advantageous due to the ease with which it can be formed during manufacturing. However, it is noted that the tab receiving openings can be formed in other shapes without departing from the scope of the disclosed concept. Each U-shaped cutout comprises a medial arm 111 and a lateral arm 112 connected by a bend 114, with the heights (i.e. relative to the height dimension 402) of the medial arm 111 and lateral arm 112 being orthogonal to the bottom edge 108 of the detachable barrier 100. Adjacent to each tab receiving opening 104, there is a jut 116, the jut 116 being a portion of the detachable barrier 100 positioned adjacent to the bend 114 and positioned between the medial arm 111 and the lateral arm 112 relative to the lengthwise dimension 401.

After the first step of the installation process, wherein the notch 102 of the barrier 100 is seated on top of the shelf 65 of the hinge tab 52, the second step of the installation process is to lock the detachable barrier 100 into place on the mounting base 50 by facilitating engagement between the locking tabs 54 of the mounting base 50 and the tab receiving openings 104 of the detachable barrier 100. It is noted that the medial and lateral arms 111, 112 of the tab receiving openings are formed to be wider in the lengthwise dimension 401 than the length 411 of each locking tab 54 (see FIG. 6C). For a given locking tab 54 and its corresponding tab receiving opening 104, the locking tab 54 is positioned on the mounting base 50 and the tab receiving opening 104 is positioned on the detachable barrier 100 so that, when the barrier notch 102 is seated on the hinge tab 52, some portion of the width of either the medial arm 111 or the lateral arm 112 (but not both) of the tab receiving opening 104 aligns with the length 411 of the locking tab 54, with said portion of the width of the medial arm 111 or lateral arm 112 being less than the entire width. With respect to a given locking tab 54 and its corresponding tab receiving opening 104, said medial arm 111 or lateral arm 112 whose width partially overlaps with the length 411 of the locking tab 54 is referred to hereinafter as the "aligning portion" or "aligning arm".

Because the detachable barrier 100 is produced from either a flexible or semi-rigid material, the detachable barrier 100 can be bent. In order to lock the detachable barrier 100 to the mounting base 50, the detachable barrier 100 can be bent to fully align the aligning arm 111 or 112 with the length 411 of its corresponding locking tab 54 so that the locking tab 54 can be inserted in the frontward direction 403 through the aligning arm 111 or 112. Once the locking tab 54 is inserted through the aligning arm 111 or 112, the bending force can be removed from the barrier 100. Removing the bending force causes the barrier 100 to flatten, i.e. return to a planar state. The flattening of the barrier 100 results in: (1) the barrier 100 extending somewhat in the lengthwise dimension 401 so that the length 411 of each locking tab 54 no longer completely aligns with the width of the aligning arm 111 or 112, and (2) the retention profile 77 of each locking tab 54 extending frontward 403 directly in front of the some portion of the front surface 105 of the detachable barrier 100 (e.g. such as the jut 116 adjacent to the corresponding tab receiving opening 104). This results in the locked state shown in FIG. 5 and FIG. 8, as well as FIGS. 1-4. The mounting base 50 and the detachable barrier 100 are specifically proportioned so that, in the locked state, the detachable barrier 100 lies flush against the front surfaces 59 of the mounting base 50, in order to contain within the interior of the switchbox 1 any arcing that may occur when the line side components 2 are energized.

In the locked state, the significance of the frontward 403 extension of the retention profile 77 relative to the barrier front surface 105 (e.g. the jut 116) is that, if the barrier 100 is pulled frontward without any bending force applied, each jut 116 or other portion of the barrier front surface 105 is obstructed from moving any further frontward relative to the retention profile 77 of the corresponding locking tab 54. Thus, the frontward extension of each retention profile 77 relative to its locking tab 54 prevents the detachable barrier 100 from being removed without a bending force intentionally being applied to the detachable barrier 100. It is noted that probe openings 120 (numbered in FIG. 5 and FIGS. 7-9) are formed in the detachable barrier 100 in order to enable test probes to be inserted through the detachable barrier 100 and into the interior of the switchbox 1 when the detachable barrier 100 is mounted and locked onto the mounting base 50.

It is noted that FIGS. 5, 8, 2, and 3 all show embodiments where the mounting base 50 and detachable barrier 100 are each proportioned such that the locking tabs 54 extend through the medial arms 111, while FIGS. 1 and 4 show embodiments where the mounting base 50 and detachable barrier 100 are each proportioned such that the locking tabs 54 extend through the lateral arms 112. That is, in the embodiments shown in FIGS. 5, 8, 2, and 3, the aligning arms are the medial arms 111, while in the embodiments shown in FIGS. 1 and 4, the aligning arms are the lateral arms 112. It will be appreciated that the same locking functionality detailed above applies regardless of whether the aligning arms are the medial arms 111 or the lateral arms 112. It is further noted that, in comparing FIG. 8 to FIG. 5, the positioning of the locking tabs 54 and the tab receiving openings 104 in the lengthwise dimension 401 can vary between embodiments, and this variation in lengthwise positioning is a result of the locking tabs 54 in FIG. 5 being formed on exterior channel walls 57A, while the locking tabs 54 in FIG. 8 are formed on interior channel walls 57B (with representative interior channel walls 57B being labeled in FIG. 6).

Figure 10:
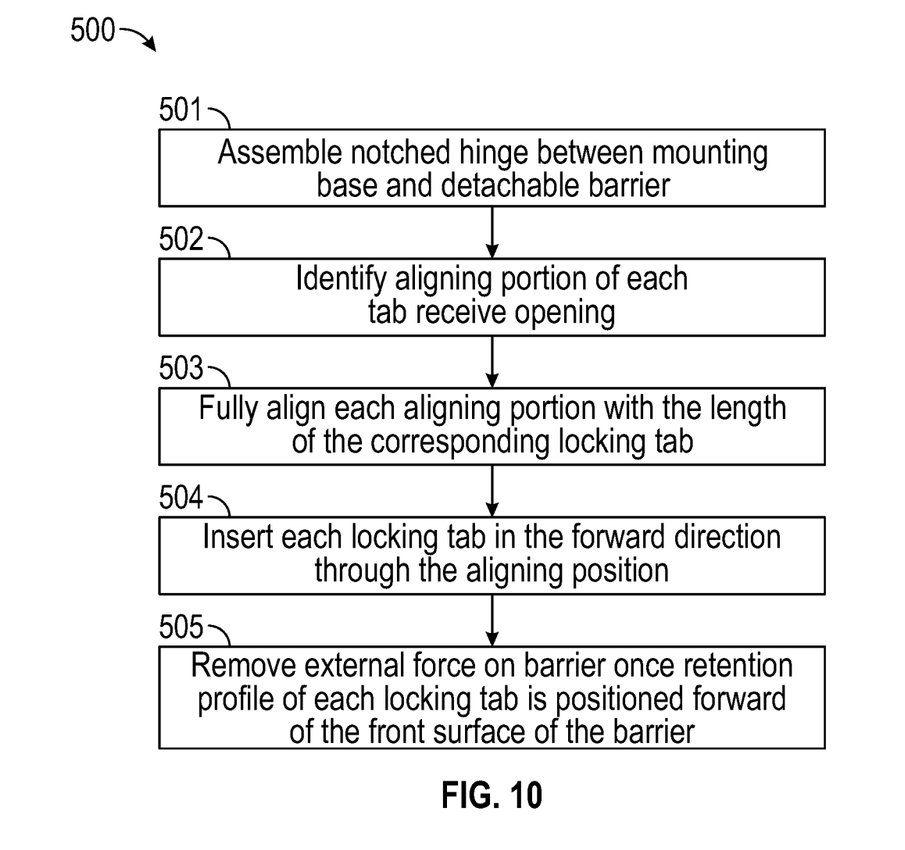
FIG. 10 is a flow chart of a method of installing a detachable barrier in an electrical switching apparatus to form an arc shield, in accordance with an example embodiment of the disclosed concept.

FIG. 10 is a flowchart of a method 500 of installing a detachable barrier in an electrical switching apparatus to form an arc shield, in accordance with an example embodiment of the disclosed concept. The method of FIG. 10 may be employed, for example, with the mounting bases 50, detachable barriers 100, and switching apparatuses 1 shown in FIGS. 1-9 and is described in conjunction with the representative mounting base 50 and detachable barrier 100 shown in FIGS. 5-7. However, it will be appreciated that the method 500 may be employed in other devices as well without departing from the scope of the disclosed concept. The method begins at 501 where a notched hinge between the mounting base 50 and the detachable barrier 100 is assembled by seating the notch 102 of the barrier 100 on the hinge tab 52 of the mounting base 50, while ensuring that the detachable barrier 100 is positioned so that its rear side 106 faces the front side 55 of the mounting base 55. As previously stated herein, the term "notched hinge" as used herein denotes a hinge that is produced by engagement between a notch (i.e. the notch 102) and a tab (i.e. the hinge tab 52) structured to engage the notch.

At 502, the aligning portion of each tab receiving opening 104 of the detachable barrier 100 is identified. As previously stated herein, with respect to a given locking tab 54 and its corresponding tab receiving opening 104, the arm (i.e. either the medial arm 111 or lateral arm 112) of the tab receiving opening 104 whose width partially overlaps with the length 411 of the locking tab 54 is the aligning portion (i.e. aligning arm). At 503, the detachable barrier 100 is bent or otherwise manipulated in order to fully align the aligning portion (i.e. the aligning arm 111 or 112) of each tab receiving opening 104 with the length 411 of the corresponding locking tab 54. At 504, each locking tab 54 is inserted in the frontward direction 403 through the aligning portion, i.e. the aligning arm 111 or 112. At 505, the bending force is removed once each locking tab 54 is inserted through its corresponding aligning portion (arm 111 or 112) such that the retention profile 77 of each locking tab 54 is positioned frontward 403 relative to the front surface 105 of the detachable barrier 100. Removing the bending force at 505 enables each retention profile 77 to be positioned directly frontward 403 in front of some portion of the barrier front surface 105 (e.g. the jut 116 adjacent to the tab receiving opening 104). It is noted that steps 503 through 505 can either be performed simultaneously on both locking tabs 54 or can be performed for one locking tab 54 first and the other locking tab 54 second, without departing from the scope of the disclosed concept.

In addition to the previously noted advantageous features of not requiring any hardware or gloves to install the detachable barrier 100 on the mounting base 50, the disclosed arc shield 150 and its multipoint mounting system (the multipoint mounting system comprising the hinge tab 52, the locking tabs 54, the notch 102, and the tab receiving openings 104) is also advantageous because the hinge tab 52 and the locking tabs 54 do not fatigue over repeated use. While the switchboxes 1 depicted in the figures are structured to house three switches, it is noted that the disclosed mounting bases 50 and detachable barriers 100 can be adapted for use with switchboxes 1 having more or fewer than three switches without departing from the scope of the disclosed concept. In addition, the mounting and locking features (i.e. the hinge tab 52, locking tabs 54, notch 102, and tab receiving openings 104) of the mounting base 50 and detachable barrier 100 can be easily adapted for mounting bases and detachable barriers structured for use with electrical apparatuses other than switchboxes 1, without departing from the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An arc shield for an electrical apparatus, the arc shield being structured to shield a user from energized electrical components in the electrical apparatus, the arc shield comprising:
   a mounting base, the mounting base comprising:
      a hinge tab, the hinge tab including a ledge portion and a lip portion; and two locking tabs, each locking tab including a retention portion with a retention profile; and
a detachable barrier, the detachable barrier comprising:
a notch; and
two tab receiving openings,
wherein each tab receiving opening has a corresponding locking tab, the corresponding king tab being one of the two locking tabs,
wherein the notch is structured to be seated upon the ledge portion of the hinge tab such that the detachable barrier is positioned between a front surface of the mounting base and the lip portion of the hinge tab,
wherein each locking tab has a tab width relative to a lengthwise dimension, the lengthwise dimension being orthogonal to the front surface of the mounting base, and
wherein, for each tab receiving opening, the tab receiving opening is structured to enable the retention portion of the corresponding locking tab to extend frontward relative to a front surface of the detachable barrier, such that the retention portion obstructs the detachable barrier from moving frontward past the retention profile when no bending force is exerted upon the detachable barrier.

2. The arc shield of claim 1,
wherein the detachable barrier is structured to be planar when no external force is acting upon the detachable barrier,
wherein the detachable barrier is structured to require a bending force to be exerted upon the detachable barrier in order to enable the locking tabs to be inserted frontward through the tab receiving openings.

3. The arc shield of claim 1,
wherein the hinge tab extends frontward relative to the front surface of the mounting base, and
wherein each locking tab extends frontward relative to the front surface of the mounting base.

4. The arc shield of claim 1,
wherein the detachable barrier is structured such that, when the notch is seated upon
the ledge portion of the hinge tab:
for each tab receiving opening, some portion of the tab receiving opening is
an aligning portion that partially aligns with the tab width of the corresponding locking tab when no bending force is acting upon the detachable barrier,
the detachable barrier can be bent in order to enable the aligning portion of each tab receiving opening to fully align with the tab width of the corresponding locking tab.

5. The arc shield of claim 4,
wherein the tab receiving openings are U-shaped cutouts, such that each tab receiving opening comprises two arms connected by a bend extending between the two arms, and
wherein, for each tab receiving opening, the aligning portion is one of the two arms.

6. The arc shield of claim 5,
wherein, for each tab receiving opening:
the two arms include one medial arm and one lateral arm, and
a height of the medial arm and a height of the lateral arm are orthogonal to a bottom edge of the detachable barrier.

7. The arc shield of claim 1,
wherein the notch is formed as a cutout in a bottom edge of the detachable barrier such that the cutout extends upward from the bottom edge of the detachable barrier, and
wherein the tab receiving openings are positioned above the notch.

8. The arc shield of claim 7,
wherein the locking tabs are positioned above the hinge tab.

9. The arc shield of claim 1,
wherein, for each locking tab, the retention profile is formed as a curve orthogonal to the front surface of the mounting base.

10. The arc shield of claim 1,
wherein, for each locking tab, the retention profile is formed as a plurality of retention surfaces, with each retention surface having two adjacent surfaces and being positioned at an obtuse angle relative to the two adjacent surfaces.

11. A method of installing a detachable barrier in an electrical switching apparatus to form an arc shield, the method comprising:
providing a mounting base, the mounting base comprising:
a hinge tab, the hinge tab including a ledge portion and a lip portion; and
two locking tabs, wherein each locking tab:
includes a retention portion with a retention profile; and
has a tab width relative to a lengthwise dimension, the lengthwise dimension being orthogonal to a front surface of the mounting base;
providing the detachable barrier, the detachable barrier comprising:
a notch; and
two tab receiving openings, wherein each tab receiving opening has a corresponding locking tab, the corresponding locking tab being one of the two locking tabs;
seating the notch upon the ledge portion of the hinge tab such that the detachable barrier is positioned between the front surface of the mounting base and the lip portion of the hinge tab; and
for each tab receiving opening, inserting the retention portion of the corresponding locking tab through the tab receiving opening such that the retention portion extends frontward relative to a front surface of the detachable barrier.

12. The method of claim 11,
wherein the detachable barrier is structured to be planar when no external force is acting upon the detachable barrier, and
wherein the method further comprises bending the detachable barrier in order to insert the locking tabs through the tab receiving openings.

13. The method claim 11,
wherein the hinge tab extends frontward relative to the front surface of the mounting base, and
wherein each locking tab extends frontward relative to the front surface of the mounting base.

14. The method of claim 11,
wherein the detachable barrier is structured such that, when the notch is seated upon the ledge portion of the hinge tab:
for each tab receiving opening, some portion of the tab receiving opening is an aligning portion that partially aligns with the tab width of the corresponding locking tab when no bending force is acting upon the detachable barrier, and wherein the method further comprises:
identifying the aligning portion of each tab receiving opening and bending the detachable barrier, for each tab opening, fully aligning the aligning portion of the tab receiving opening with the tab width of the corresponding locking tab prior to inserting the retention portion of the corresponding locking tab through the tab receiving opening, and removing all bending force from the detachable barrier once the retention portion of each locking tab extends frontward relative to the front surface of the detachable barrier.

15. The method of claim 14,
wherein the tab receiving openings are U-shaped cutouts, such that each tab receiving opening comprises two arms connected by a bend extending between the two arms, and wherein, for each tab receiving opening, the aligning portion is one of the two arms.

16. The method of claim 15,
wherein, for each tab receiving opening:
the two arms include one medial arm and one lateral arm, and a height of the medial arm and a height of the lateral arm are orthogonal to a bottom edge of the detachable barrier.

17. The method of claim 11,
wherein the notch is formed as a cutout in a bottom edge of the detachable barrier such that the cutout extends upward from the bottom edge of the detachable barrier, and wherein the tab receiving openings are positioned above the notch.

18. The method of claim 17,
wherein the locking tabs are positioned above the hinge tab.

19. The method of claim 11,
wherein, for each locking tab, the retention profile is formed as a curve orthogonal to the front surface of the mounting base.

20. The method of claim 11,
wherein, for each locking tab, the retention profile is formed as a plurality of retention surfaces, with each retention surface having two adjacent surfaces and being positioned at an obtuse angle relative to the two adjacent surfaces.

* * * * *